United States Patent [19]

Kobayashi et al.

[11] Patent Number: 5,805,564
[45] Date of Patent: Sep. 8, 1998

[54] OPTICAL DISK CAPABLE OF DETECTING ERRORS IN ADDRESS AREA AND CORRECTING ERRORS IN DATA AREA AND RECORDING METHOD AND APPARATUS THEREFOR

[75] Inventors: Shoei Kobayashi, Kanagawa; Yoichiro Sako, Chiba; Tamotsu Yamagami, Kanagawa, all of Japan

[73] Assignee: Sony Corporation, Tokyo, Japan

[21] Appl. No.: 654,599

[22] Filed: May 29, 1996

[30] Foreign Application Priority Data

Jun. 2, 1995 [JP] Japan ................................ 7-136329

[51] Int. Cl.⁶ ............................ G11B 7/24; H03M 13/00
[52] U.S. Cl. ........................... 369/275.3; 371/38.1
[58] Field of Search .................. 369/275.3, 59, 369/54, 32, 58, 47, 48; 371/38.1, 37.1, 37.3, 37.4, 37.7

[56] References Cited

U.S. PATENT DOCUMENTS

| | | |
|---|---|---|
| 4,788,685 | 11/1988 | Sako et al. ................................ 371/38 |
| 4,821,253 | 4/1989 | Usui et al. ................................ 369/54 |
| 5,060,221 | 10/1991 | Sako et al. ................................ 369/59 |
| 5,216,656 | 6/1993 | Sako et al. ................................ 369/59 |
| 5,408,478 | 4/1995 | Ohmori et al. ........................ 371/37.5 |
| 5,455,814 | 10/1995 | Sako ........................................ 369/59 |
| 5,469,416 | 11/1995 | Yamagami et al. ...................... 369/48 |
| 5,587,901 | 12/1996 | Yamagami et al. .................. 369/275.3 |
| 5,617,384 | 4/1997 | Yonemitsu et al. .................... 371/38.1 |

*Primary Examiner*—Tan Dinh
*Attorney, Agent, or Firm*—Limbach & Limbach L.L.P.

[57] ABSTRACT

It is an object of the present invention to realize a data recording disk that is resistant against burst errors and capable of quick access without sacrificing recording capacity. A disk 1 is divided into zones, and the number of sectors per track is made larger by one in a more outside zone than in a more inside zone. The disk 1 is driven at a constant rotational angular velocity. The sector is composed of an address area and a data area, and it is arranged for the address recorded in the address area to complete error detection and correction processing within the address area. An error detection and correction code in the data area is completed extending over a plurality of sectors.

7 Claims, 13 Drawing Sheets

HEADER

RECORDING AREA

FRAME STRUCTURE (SECTOR)

ECC FORMAT (8 SECTORS)

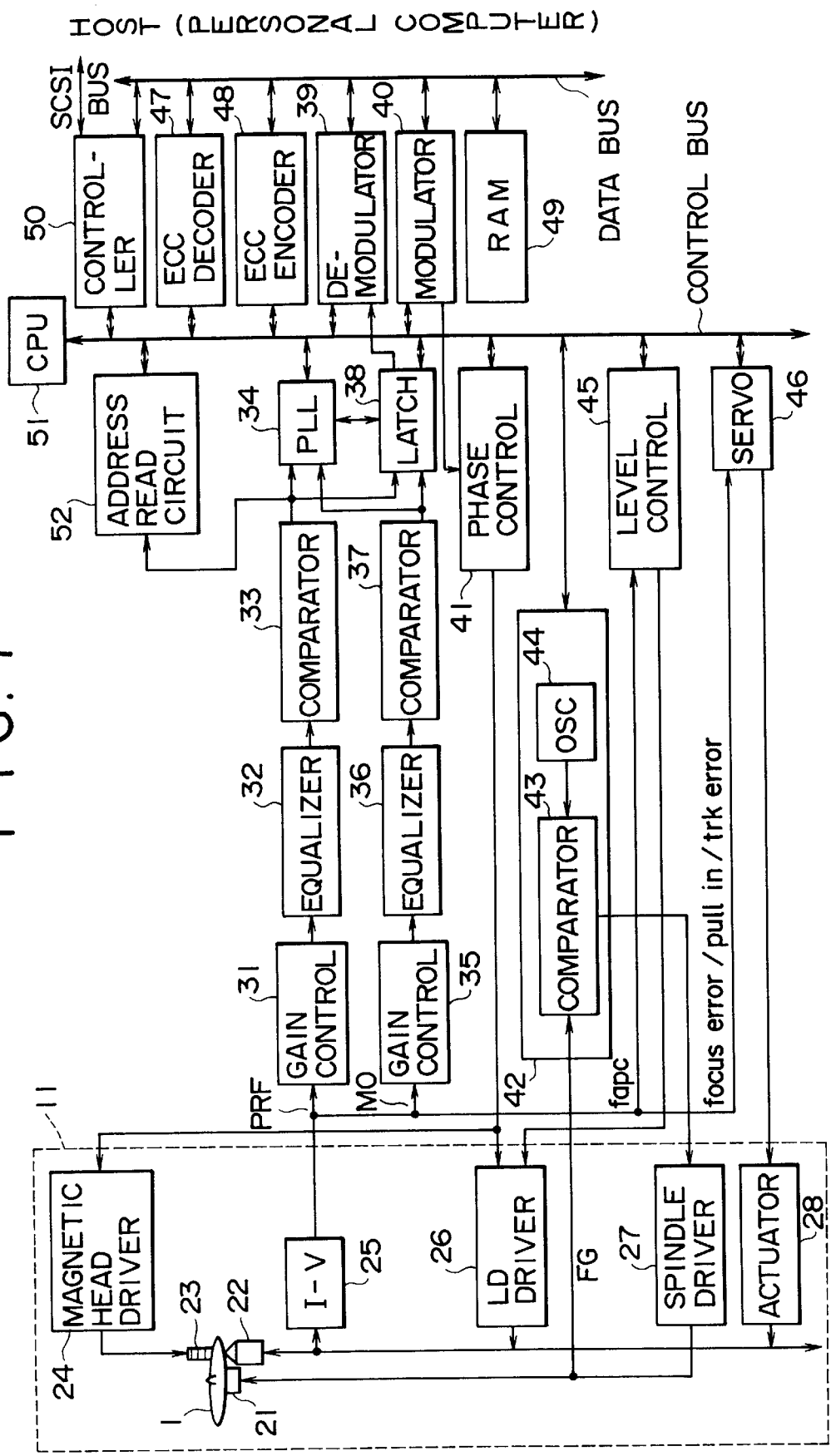
F I G. 7

ERROR CORRECTION ENCODE PROCESSING

ERROR CORRECTION DECODE PROCESSING

FRAME STRUCTURE (SECTOR)

ECC FORMAT

OPTICAL DISK CAPABLE OF DETECTING ERRORS IN ADDRESS AREA AND CORRECTING ERRORS IN DATA AREA AND RECORDING METHOD AND APPARATUS THEREFOR

BACKGROUND OF THE INVENTION

The present invention relates to a data recording disk, and more particularly to a data recording disk which is made more resistant to burst errors without decreasing recording capacity.

In a data recording disk, a track of one rotation's portion is normally divided into a plurality of sectors. Further, it is arranged so that address information is recorded in each sector, and predetermined data are recorded and regenerated in each sector with the address as reference.

In order to make access to a data recording disk quickly, it is desirable to rotate the disk at a constant angular velocity (CAV). When a disk is rotated at a constant angular velocity, however, the linear recording density along the outer circumference of the disk becomes lower than that along the inner circumference thereof, and the recording capacity becomes smaller by that portion.

Now, a disk that is made to be driven at a constant linear velocity (CLV) is also known. When the CLV is adopted, linear recording densities along the inner circumference and the outer circumference of the disk become equal to each other. Therefore, it is possible to increase the recording capacity of the disk by that portion. In the CLV disk, however, access performance is deteriorated since the position of the sector in each track varies from track to track.

Accordingly, a zone CAV disk in which the track is divided radially into a plurality of zones and the number of the sectors per track in an outside zone is set so as to be made larger by one sector more than the number of sectors per track in an inside zone successively, and which is rotated at a constant angular velocity has been proposed. Within the zone, the number of sectors per track is made constant. Accordingly, although the recording density is not as high as the CLV disk, it is possible to improve the recording density as compared with the CAV disk. Further, since the zone CAV disk is always rotated at a constant rotational angular velocity (namely, since it is similar to a normal CAV disk in this point), irrespective of the zone, quick access becomes possible as compared with the CLV disk.

Now, it is desired of late to further increase the recording capacity of the data recording disk. As a result, such a tendency that a track pitch is narrowed and a bit length is shortened, thereby to make a surface density of the whole disk higher is being developed. For example, such values that 0.9 $\mu$m as the track pitch and 0.34 $\mu$m as the bit length are proposed.

When recording at high density is performed by making the track pitch and the bit length shorter, the length of one sector becomes shorter. As a result, in such a case that a disk is injured along a predetermined length, the number of data that are damaged within a sector for a crack in the same length is increased as densification is advanced.

Since detection and correction of errors in data are normally made in the unit of a sector, it means that, when densification advances, the disk becomes weaker against burst errors by that portion.

Therefore, it is conceivable to increase the interleaving length in order to make the disk stronger against burst errors. In order to increase the interleaving length, it is required to make the sector length longer for instance. However, there has been a subject that, when a longer sector is adopted, zoning efficiency is deteriorated and the recording capacity of the disk is reduced.

Therefore, as shown in FIG. 19 for instance, a a scope for error detection and correction (a scope of interleaving) is set extending over several sectors in a CLV disk for a ROM for exclusive use for regeneration.

In the example shown in FIG. 19, one sector is composed of 28 frames, one frame consists of 87 bytes, including a frame sync (FS) of two bytes.

Further, 20 bytes at the head of each sector are used as an address area, where sector addresses are arranged.

Further, a C1 code and a C2 code are used as error correction codes, and the C1 codes are provided for those data that are arranged in a horizontal direction in the figure and the C2 codes are provided for those data that are arranged in an oblique direction. The C1 code is to consist of 8 bytes and the C2 code of 14 bytes.

Besides, an error detection code (EDC) in 4 bytes is also provided in each sector.

Namely, in this example, the interleaving length of the C1 code becomes 170 bytes, and the interleaving length of the C2 code is to include 170 bytes (170 frames).

In this example, however, since the error correction on the address is made similarly to the error correction on the data, the data of 170 frames (approximately 13 sectors) have to be read in order to make error detection and correction of the addresses, and quick error detection and correction cannot be made, thus preventing quick access.

OBJECT AND SUMMARY OF THE INVENTION

The present invention has been made in view of such circumstances, and makes a disk more resistant against burst errors while securing the recording capacity and makes quick access possible.

A data recording disk set according to the present invention characterized in that a first code for address error detection is completed within a first area and a second code for data error correction is completed extending over a plurality of sectors.

A method of recording data according to the present invention is characterized in that a first code for address error detection is completed in a first area and a second code for data error correction is completed extending over a plurality of sectors.

An apparatus for recording data according to the present invention comprises address processing means which performs processing of the codes for address error detection within one first area and data processing means which performs processing of the codes for data error correction extending over a plurality of sectors.

A method of recording data according to the present invention is characterized in that recording is made at a constant linear velocity when first data are recorded in a data recording disk, recording is made at a constant rotational angular velocity when second data are recorded in a data recording disk, and formats of the sector in the case of recording at a constant linear velocity and in the case of recording at a constant rotational angular velocity are made the same.

In a data recording disk according to the present invention, a first code for address error detection is completed within a first area, and a second code for data error correction is completed extending over a plurality of sectors.

In a method of recording data according to the present invention, a first code for address error detection is completed within a first area, and a second code for data error correction is completed extending over a plurality of sectors.

In an apparatus for recording data according to the present invention, address processing means performs processing on a code for address error detection within one first area, and data processing means performs processing on a code for data error correction extending over a plurality of sectors.

BRIEF DESCRIPTION OF THE DRAWINGS

FIG. 7 is a block diagram showing a configuration example of a data recording and regenerating apparatus for recording and regenerating data in a data recording disk of the present invention;

DESCRIPTION OF THE PREFERRED EMBODIMENT

Figure 1:
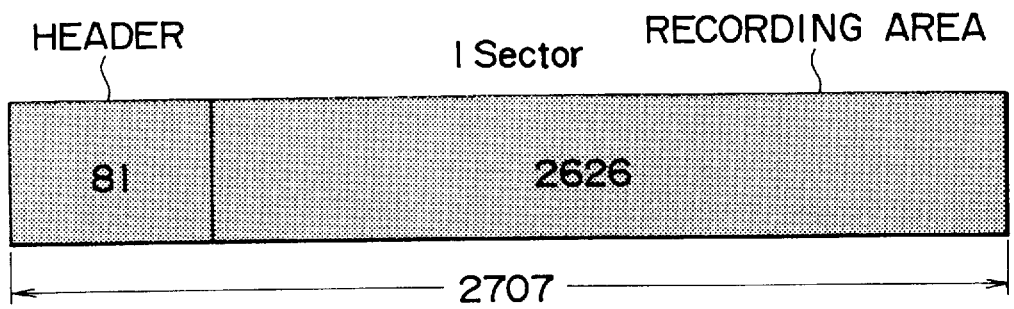
FIG. 1 is a diagram for explaining a sector structure of a data recording disk of the present invention.

FIG. 1 shows a format of a sector of a data recording disk of the present invention. In the present embodiment, a sector is to have a length of 2,707 bytes (words), and 81 bytes at the head form a header and 2,626 bytes thereafter form a recording area.

Figure 2:
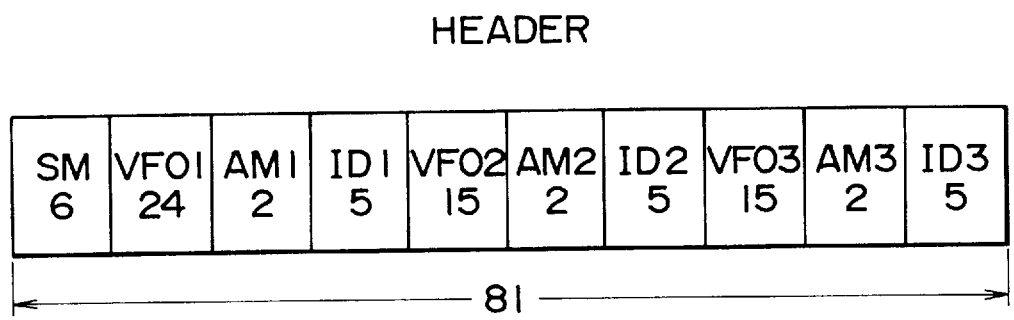
FIG. 2 is a diagram showing a configuration of the header shown in FIG. 1.

FIG. 2 shows a configuration example of a header which represents address information. The first six bytes are used as a sector mark (SM). The next 24 bytes form a VFO in which a clock for drawing in a PLL circuit (such as a PLL circuit 34 shown in FIG. 7) for regenerating a clock is arranged, the next two bytes are used as an address mark (AM), and an address (ID) is arranged in the next five bytes. An error detection code is included in this address (ID), so that error detection may be made within the address area (ID).

In a similar manner thereafter, a VFO in 15 bytes, an address mark in two bytes and an address (ID) in five bytes are recorded twice successively.

Figure 3:
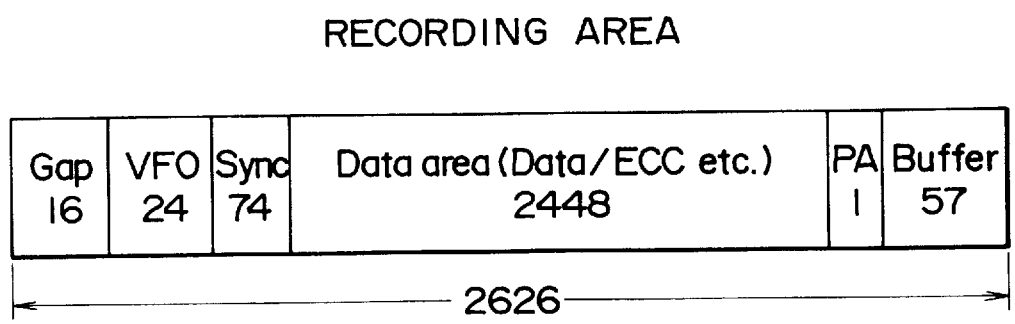
FIG. 3 is a diagram for explaining a configuration of the recording area shown in FIG. 1.

FIG. 3 shows a configuration example of a recording area. 16 bytes at the head form a Gap for obtaining time to spare for switching the power of an optical head (such as an optical head 22 shown in FIG. 7) for recording or regenerating data for a disk at recording time over to the power at regenerating time, and the following 24 bytes form a VFO in which a clock for drawing in PLL is arranged. The next 74 bytes are to form a sink area including a sector sync or a frame sync.

The next 2,448 bytes form a data area, where data or an error correction code (ECC) are arranged. The next one byte is to be a postamble (PA), and the following 57 bytes form a buffer area for absorbing jitter or eccentricity of a disk.

Figure 4:
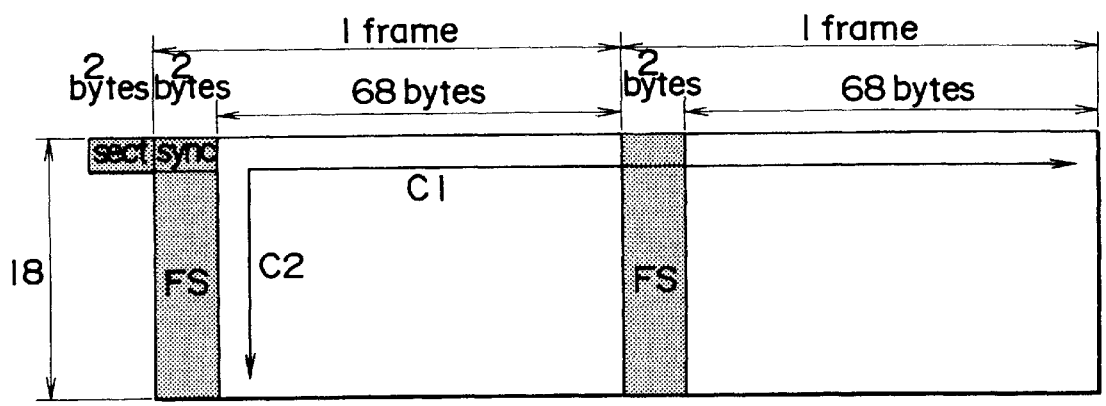
FIG. 4 is a diagram for explaining a frame structure of a sector of a data recording disk of the present invention.

FIG. 4 shows a frame structure of one sector in the case of a writable disk such as a phase change type optical disk or a magneto-optic disk. In the present embodiment, one sector is composed of 36 frames, one frame consists of 70 bytes, a frame sync (FS) is arranged in two bytes at the head, and data are arranged in the remaining 68 bytes.

A sector sync in four bytes is arranged at the head of the sector.

In the present embodiment, C1 and C2 are used as the codes for data error correction. These codes C1 and C2 are made to form a parity code as shown in FIG. 5.

Figure 5:
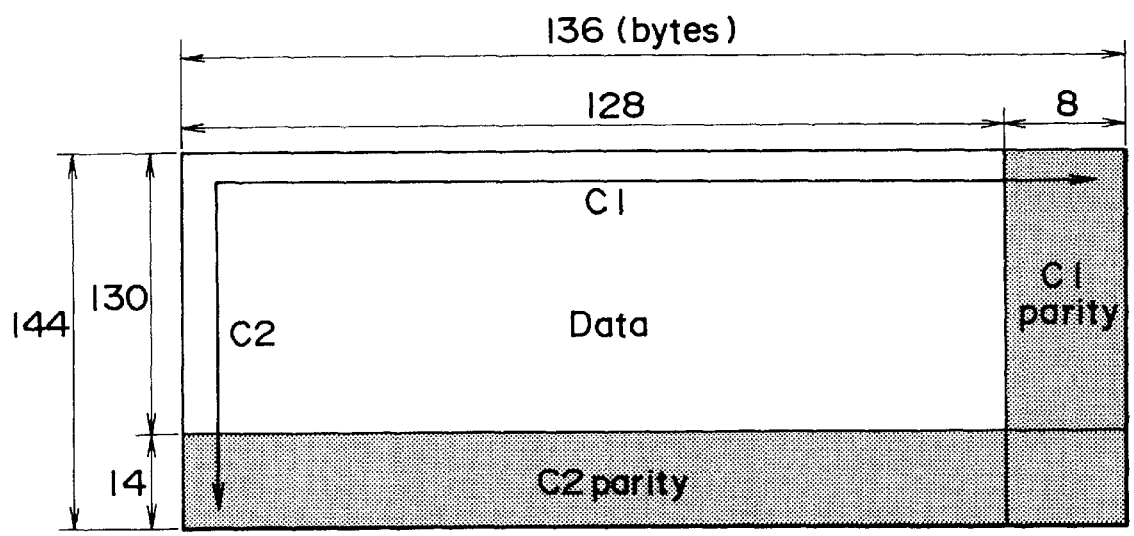
FIG. 5 is a diagram for explaining a format of an error correction code of a sector having the frame structure shown in FIG. 4.

The code C1 is completed within two frames in the same sector as shown in FIG. 5. Namely, C1 is formed as a code in 8 bytes, and is set against interleaving data in a horizontal direction (recording direction) in the figure, and the interleaving length is to be 136 bytes.

As against the above, the code C2 is a code in 14 bytes, and 144 bytes (144 frames) (8 sectors) in a direction vertical to the code C1 forming the interleaving length.

Accordingly, when it is possible to detect and correct an error by the code C1 only, the error can be corrected with the data in the sector. In contrast to the above, when the code C2 is used, it becomes possible to detect and correct the error by putting 8 sectors' parts of data together.

Figure 6:
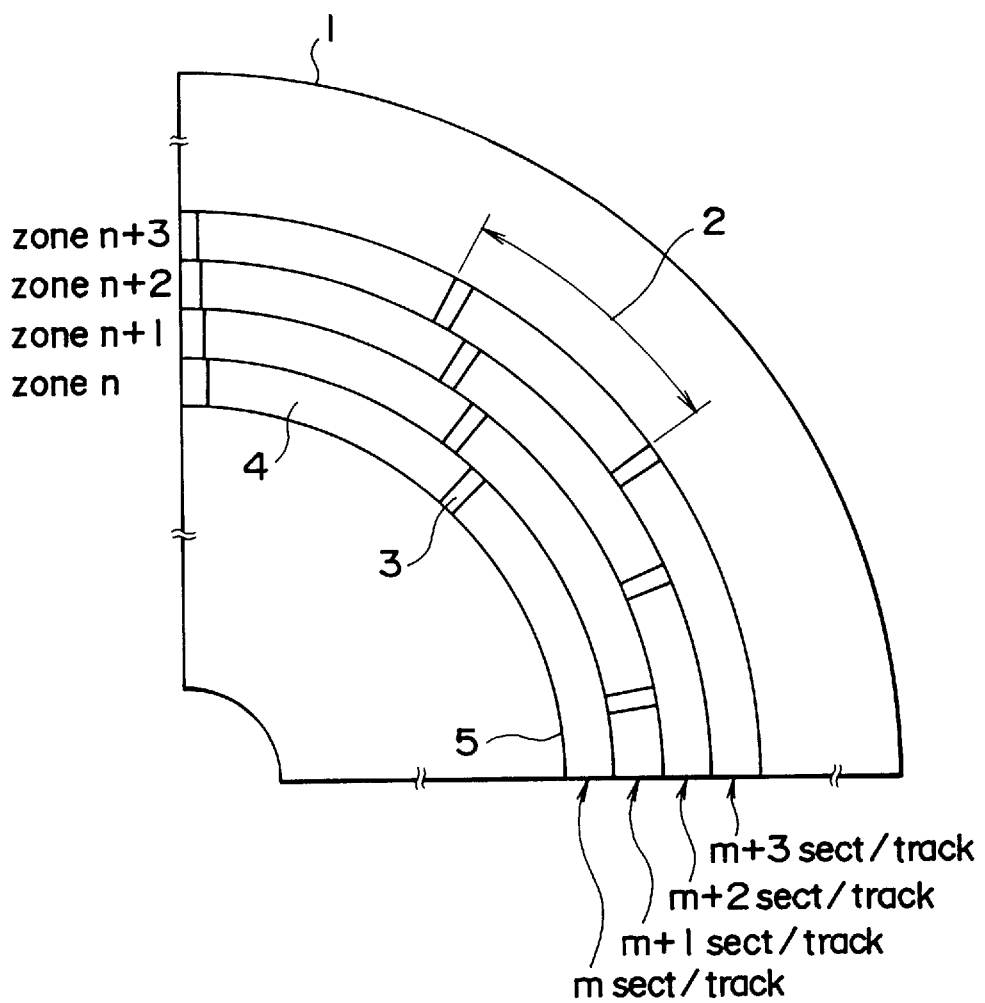
FIG. 6 is a diagram for explaining zones of a data recording disk of the present invention.

FIG. 6 shows the state of tracks in a disk 1. Namely, in the present embodiment, the disk 1 is divided into a plurality of zones, and a plurality of tracks are formed in a concentric circle form or a spiral form in each zone. Further, the number of the sectors per track is made constant in each zone, and it is set so that the number of sectors per track is increased one by one every track from an inside zone to an outside zone successively.

For example, when it is assumed that the number of sectors per track in a zone n is m, the number of sectors per track is m+1 in a zone n+1 which is on the outer side of the zone n by one zone. Further, in a zone n+2 further outside thereof, the number of sectors per track becomes m+2.

Further, as shown in FIG. 6, an address area 3 is formed as a prepit at the boundary portion of each sector 2, where the address of the sector 2 (the header shown in FIG. 1 and FIG. 2) is recorded (formed) in advance. Further, the data shown in FIG. 1 and FIG. 3 are recorded in a data area 4 which is a remaining area succeeding the address area 3.

As described above, a sector address is recorded with an error detection code added thereto in this address area 3. This error detection code is completed within the address area. With this, it becomes possible to detect an address more quickly.

FIG. 7 shows a configuration example of an apparatus for recording and regeneration for the disk 1 when the above mentioned disk is a magneto-optic disk. An optical block 11 radiates a laser light to the disk 1 rotated at a predetermined speed by a spindle motor 21, and is provided with an optical head 22 receiving the reflected light therefrom and a magnetic head 23 for applying a magnetic field to a position opposite to the optical head 22. A laser diode (LD) built in the optical head 22 is driven by an LD driver 26, and the magnetic head 23 is driven by a magnetic head driver 24.

An actuator (motor) 28 moves the optical head 22 in a focus direction, a tracking direction or a radial direction of the disk 1. A spindle driver 27 drives the spindle motor 21 so as to rotate the disk 1 at a predetermined speed. When the optical head 22 receives the reflected light from the disk 1 with a built-in light receiving element, a signal from the light receiving element is converted from current to voltage by means of a current/voltage (I/V) conversion circuit 25 and outputted.

A gain control circuit 31 controls a gain of a regenerated RF signal (PRF signal) outputted by the current/voltage conversion circuit 25 to a predetermined value, and outputs the signal to an equalizer 32 thereafter. The equalizer 32 equalizes the inputted signal and outputs it to a comparator 33. The comparator 33 compares the signal inputted from the equalizer 32 with a predetermined reference level, binarizes the inputted signal and outputs it to a PLL circuit 34, a latch circuit 38 and an address read circuit 52.

On the other hand, an MO signal corresponding to optical magnetism of the disk 1 outputted by the current/voltage conversion circuit 25 is controlled to a predetermined gain by a gain control circuit 35 and inputted thereafter to an equalizer 36 so as to be equalized. Then, a signal outputted from the equalizer 36 is compared with a predetermined reference level by means of a comparator 37 and binarized, and is inputted thereafter to the PLL circuit 34 and the latch circuit 38.

The PLL circuit 34 generates a clock from the inputted signal, and outputs the generated clock to respective circuits including the latch circuit 38. The latch circuit 38 composed of a D flip-flop or the like latches a signal inputted from the comparator 33 or the comparator 37 synchronously with the clock inputted from the PLL circuit 34, and outputs the latched data to a demodulator 39.

A phase control circuit 41 controls the phase of recorded data inputted from a modulator 40, and outputs the data to the magnetic head 23 through the magnetic head driver 24. Further, the phase control circuit 41 controls LD of the optical head 22 through the LD driver 26.

Further, a level control circuit 45 receives an fapc signal, which corresponds to the intensity of the laser light emitted by a laser diode, outputted by the current/voltage conversion circuit 25, compares the inputted signal fapc with a predetermined reference level, outputs a signal corresponding to the result of comparison to the LD driver 26, and controls so that the intensity of the laser light emitted by the laser diode of the optical head 22 becomes constant.

A servo circuit 46 controls the actuator 28 corresponding to a focus error signal, a tracking error signal and a thread servo signal outputted by the current/voltage conversion circuit 25, and performs focus control, tracking control and thread (slide) control of the optical head 22.

The address read circuit 52 reads an address recorded in advance as a prepit in the disk 1 from a signal outputted by the comparator 33, and outputs the read result to a CPU 51.

A spindle servo circuit 42 compares the frequency of an FG signal outputted by the spindle motor 21 with the frequency of a signal outputted by a built in oscillator (OSC) 44 in a comparator 43, and outputs a signal corresponding to the result of comparison to the spindle driver 27 so as to drive the spindle motor 21.

An ECC decoder 47 performs error detection and correction (decode processing) of a signal demodulated by a demodulator 39, and an ECC encoder 48 performs error detection and correction code adding processing (encode processing) for recorded data supplied from a post composed of a personal computer not shown or the like through a controller 50, and supplies the encoded data to a modulator 40. The modulator 40 modulates the inputted data, and outputs the data to the phase control circuit 41. A RAM 49 stores data when the ECC decoder 47 and the ECC encoder 48 perform decode or encode processing.

Next, the operation thereof will be described. When the start of drive is commanded from the host, the controller 50 demands the CPU 51 to start the drive. At this time, the CPU 51 controls the spindle servo circuit 42 so as to drive the spindle motor 21 through the spindle driver 27. The spindle motor 21 rotates the disk 1 by this driving. At this time, the spindle motor 21 outputs an FG signal synchronized with the rotation to the comparator 43. The comparator 43 compares the frequency of this FG signal with the frequency of the signal outputted by the oscillator 44, and outputs the error signal thereof to the spindle driver 27. The spindle driver 27 drives the spindle motor 21 corresponding to this error signal. With this, the spindle motor 21, hence the disk 1 rotates at a constant angular velocity (CAV).

Further, the CPU 51 controls the level control circuit 45, and drives the laser diode of the optical head 22 through the LD driver 26. The laser diode generates the laser light, and this laser light is radiated to the disk 1. The laser light reflected by the disk 1 is received by a light receiving element which is built in the optical head 22. The current/voltage conversion circuit 25 generates a focus error signal and a tracking error signal from the output of the light receiving element, and outputs these signals to the servo circuit 46. The servo circuit 46 controls the actuator 28 corresponding to this error signal, and has the optical head 22 focus controlled and also tracking controlled.

Next, when the demand for recording is inputted from the host, the controller 50 demands recording to the CPU 51. The CPU 51 sets a recording mode at this time, thus starting a recording operation.

At time of a recording mode, the controller 50 has the recording data supplied from the host stored once in the RAM 49. The ECC encoder 48 reads out, when the data required for generating the code C1 become complete in the RAM 49, these data, operates the code C1 and returns the code C1 obtained as the result of operation to the RAM 49.

Then, when the data required for operating the code C2 have been stored in the RAM 49, the ECC encoder 48 reads the data out of the RAM 49 again and operates the code C2. Then, the code C2 obtained by operation is returned to the RAM 49.

Figure 8:
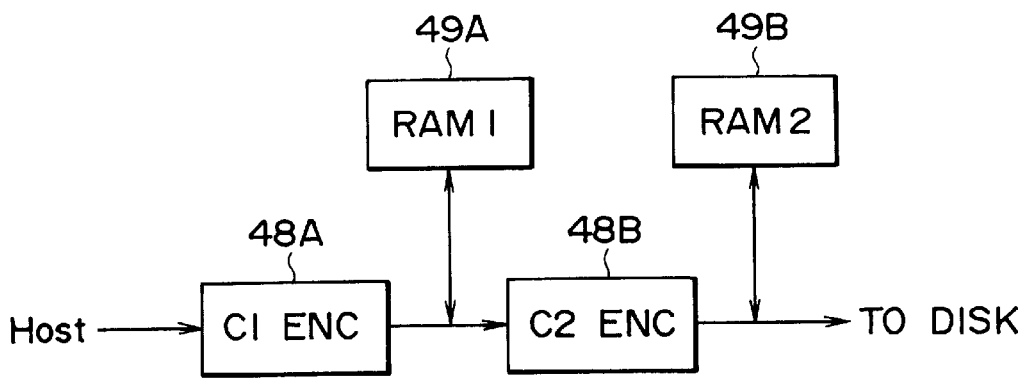
FIG. 8 is a diagram for explaining encode processing of the embodiment shown in FIG. 7.

FIG. 8 typically shows encode processing in the ECC encoder 48 and the RAM 49 described above. Namely, an ECC encoder 48A operates, when recording data are supplied from the host, the error detection and correction code C1 for these data, and supplies the obtained code C1 to a RAM 49A and stores it there. Further, when predetermined data are accumulated in the RAM 49A, an ECC encoder 48B reads data out of the RAM 49A, operates the code C2, and transfers the result obtained through the operation to the RAM 49B and has it stored there.

In such a manner, the data added with the error detection and correction codes are supplied from the RAM 49 to the modulator 40 and modulated by a predetermined system. Then, the modulated signal is inputted to the phase control circuit 41 from the modulator 40, and is supplied to the magnetic head 23 through the magnetic head driver 24 after the phase is adjusted. With this, the magnetic head 23 applies a magnetic field corresponding to the recorded data to the disk 1 (magneto-optic disk).

On the other hand, the CPU 51 controls the level control circuit 45 so as to have the LD driver 26 generate laser light having an intensity at the time of the recording mode in the laser diode of the optical head 22. As a result, data are recorded in the disk 1.

Further, positional control of the optical head 22 is made at this time as follows. Namely, the gain control circuit 31 regulates the gain of a PRF signal outputted by the current/voltage conversion circuit 25 and outputs the signal to the equalizer 32 thereafter. The equalizer 32 equalizes the inputted PRF signal and inputs the signal to the comparator 33 thereafter. The comparator 33 compares the inputted PRF signal with a reference level, binaries the signal and outputs it to the address read circuit 52. The address read circuit 52 reads the address data recorded in the address area of the disk 1 from the signal inputted from the comparator 33, and outputs the read result to the CPU 51.

The CPU 51 monitors the data from this address read circuit 52 and detects the present position of the optical head 22. Then, when the present position of the optical head 22 is different from a predetermined recording position instructed by the controller 50, the CPU 51 controls the servo circuit 46, drives the optical head 22 through the actuator 28 and moves it to the desired recording position.

On the other hand, when a regeneration command is inputted from the host, the controller 50 demands regeneration of the CPU 51. The CPU 51 sets a regeneration mode at this time, and executes regenerating action. Namely, the CPU 51 controls the servo circuit 46 similarly to the case described above, and has the actuator 28 move the optical head 22 to a predetermined regenerating position. Further, the CPU 51 controls the level control circuit 45 and has the LD driver 26 set the laser diode of the optical head 22 to a level (intensity) at time of the regenerating mode.

The gain control circuit 35 regulates the gain of an MO signal outputted by the current/voltage conversion circuit 25 and outputs the signal to the equalizer 36 thereafter. The equalizer 36 equalizes the inputted MO signal, and outputs the signal to the comparator 37 thereafter. The comparator 37 compares the MO signal inputted from the equalizer 36 with a predetermined reference signal, and binarizes the MO signal. Then, the comparator 37 outputs the binarized signal to the PLL circuit 34 and the latch circuit 38.

The PLL circuit 34 generates a clock from the outputs of the comparators 33 and 37, and outputs the clock to the latch circuit 38. The latch circuit 38 latches the data inputted from the comparator 37 synchronously with the clock inputted from the PLL circuit 34, and outputs the latched data to the demodulator 39. The demodulator 39 demodulates the inputted data, and transfers the demodulated data to the RAM 49 and stores these data there.

When data in a quantity capable of error detection and correction with the code C1 are stored in the RAM 49, the ECC decoder 47 reads out the data and performs error detection and correction processing using the code C1. Then, the ECC decoder 47 returns the obtained data to the RAM 49 again. When data in a quantity capable of error detection and correction using the code C2 are stored in the RAM 49, the ECC decoder 47 reads out the data stored in the RAM 49 again, and executes error detection and correction processing using the code C2. The ECC decoder 47 transfers the data obtained by error detection and correction processing using the code C2 to the RAM 49 again and stores the data there.

Figure 9:
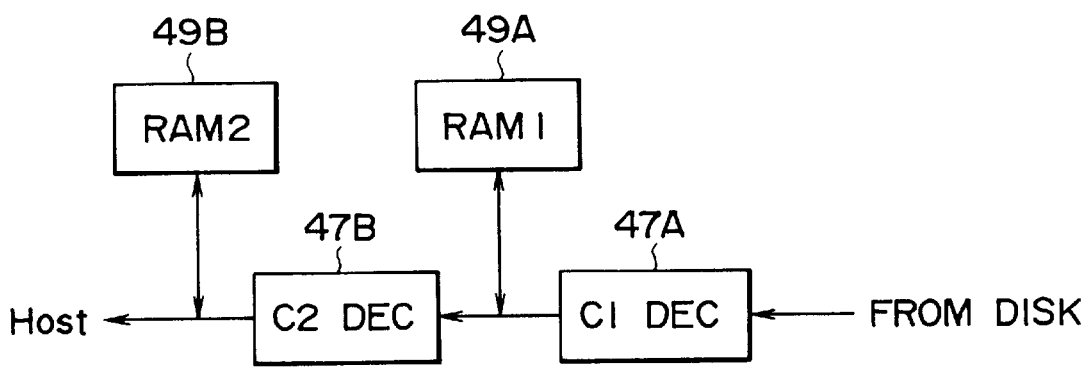
FIG. 9 is a diagram for explaining decode processing of the embodiment shown in FIG. 7.

FIG. 9 typically shows decode processing in the ECC decoder 47 described above. Namely, the data regenerated from the disk 1 is applied with error detection and correction processing using the code C1 by means of an ECC decoder 47A, and the obtained data are stored in a RAM 49A. When data in a quantity capable of error detection and correction processing using the code C2 are stored in the RAM 49A, and ECC decoder 47B reads the data out of the RAM 49A, and executes error detection and correction processing using the code C2. Then, the ECC decoder 47B transfers the data complete with error detection and correction processing to a RAM 49B and stores the data there.

As described above, when the error detection and correction processing is completed, the controller 50 reads out the data stored in the RAM 49, and outputs the data to the host.

On the other hand, as described previously, error detection of the address is completed within the address area in the present embodiment. Thus, when the address is inputted from the address read circuit 52, the CPU 51 performs error detection using an error detection code contained therein. Further, it is arranged so that the CPU 51 performs neither recording nor correction on the sector in which an error has been detected.

Figure 10:
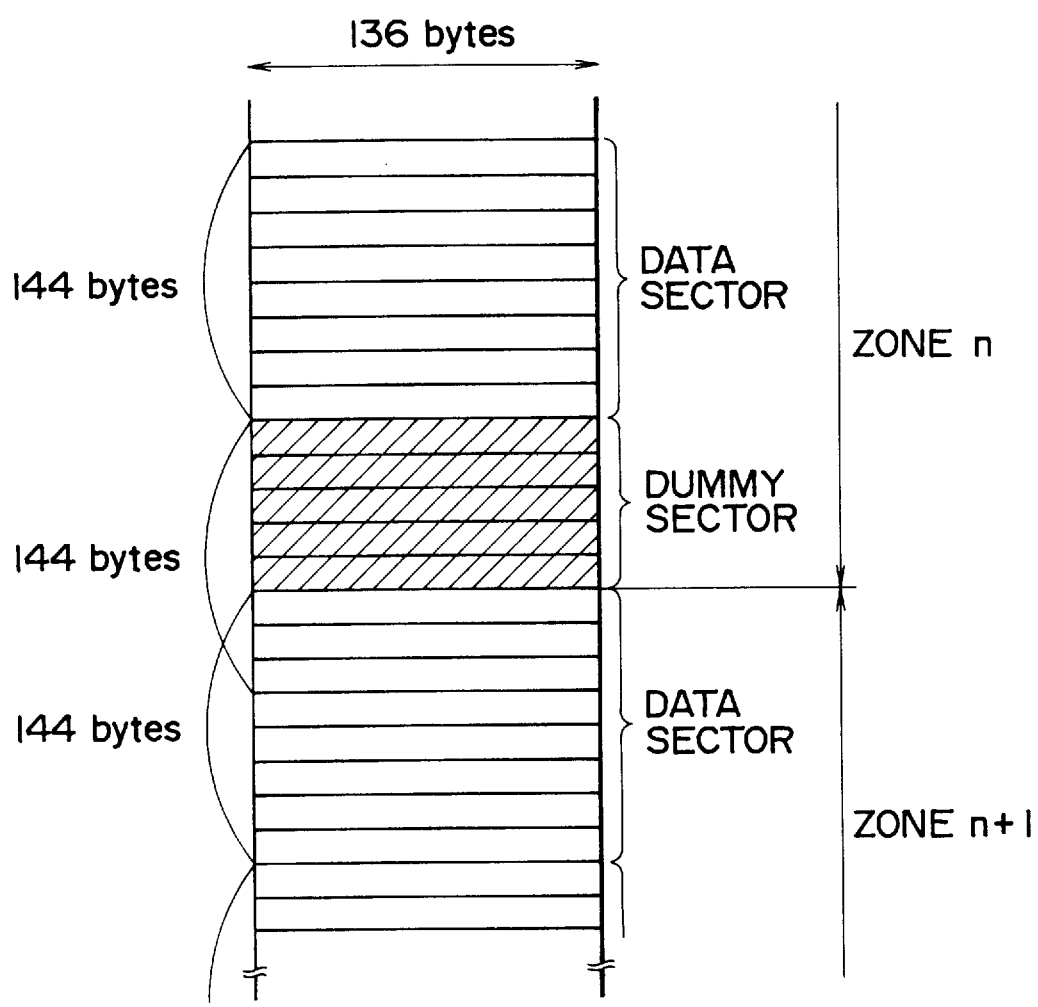
FIG. 10 is a diagram for explaining a configuration in the vicinity of a boundary portion of the zone.

In the case of an embodiment shown in FIG. 4 and FIG. 5, 144×136 bytes are adopted as a block for error detection and correction, and interleaving is completed within this block. Accordingly, when an area (block) of 144×136 bytes cannot be secured at a terminal part of a zone n as shown in FIG. 10 for instance, dummy data are made to be recorded in that area (this area is made not to be used).

Then, it is sufficient to secure an area (block) in 144×136 bytes from the head portion of a next zone (n+1), and to record data from that block.

The embodiment shown in FIG. 4 and FIG. 5 shows a format for a disk capable of recording and regeneration, but the same format is also applicable to a (ROM) disk for exclusive use for regeneration. Otherwise, it is also possible for the format of the disk for exclusive use for regeneration to adopt a format different from the format of a disk capable of recording and regeneration.

Figure 11:
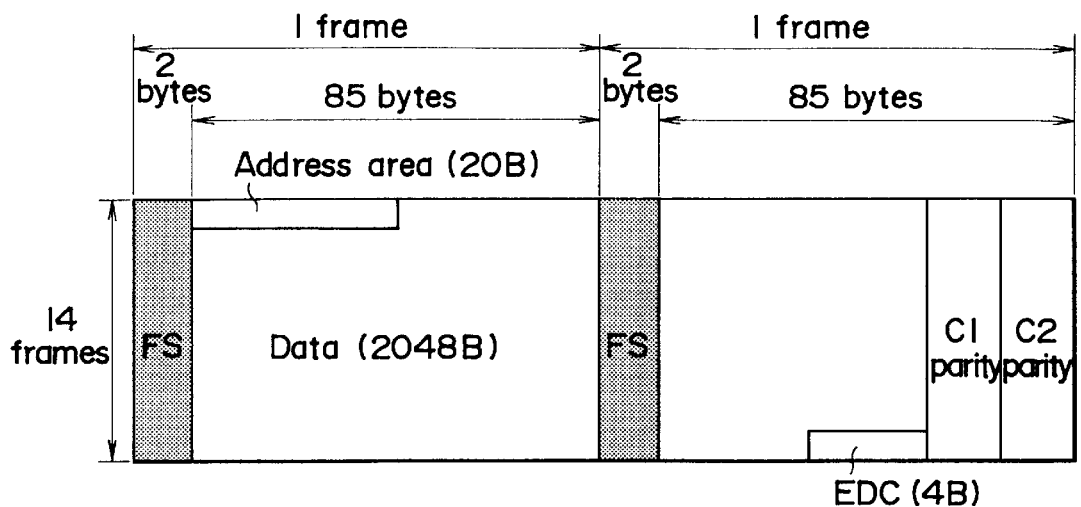
FIG. 11 is a diagram showing another frame structure of a sector.
Figure 12:
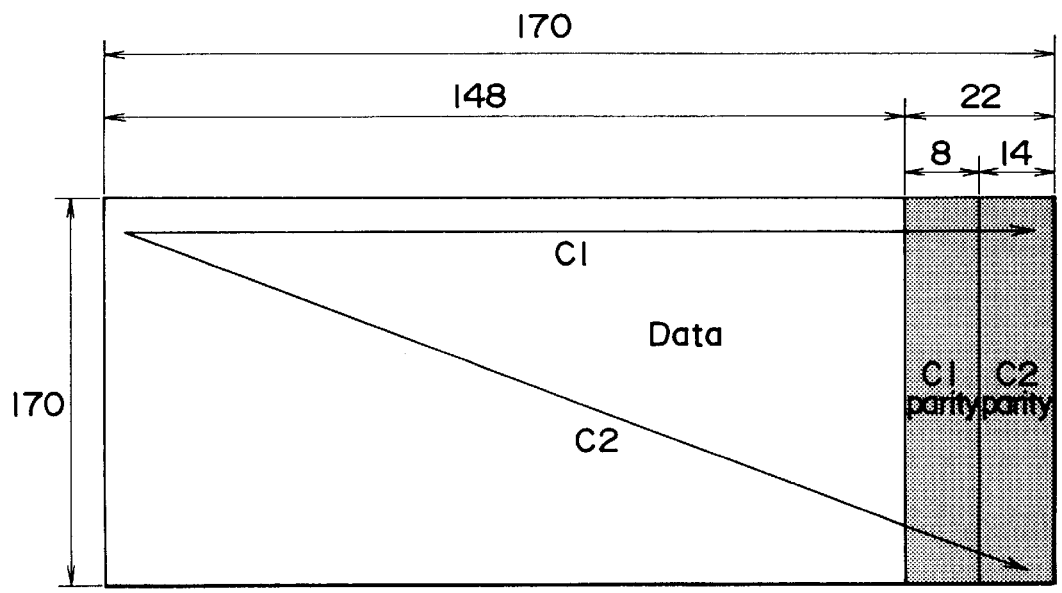
FIG. 12 is a diagram showing a format of an error detection and correction code of a sector having the frame structure shown in FIG. 11.

FIG. 11 and FIG. 12 show an example of a format of a disk for exclusive use for regeneration. In the present embodiment, as shown in FIG. 11, one sector is composed of 28 frames, one frame consists of 87 bytes, a frame sync (FS) is arranged in two bytes among these 87 bytes, and data are arranged in the remaining 85 bytes.

Further, in the present embodiment, an area of 20 bytes at the head of the sector is used as an address area, where the sector address is arranged. Further, data for error detection (EDC) in four bytes are included in the data.

Further, as shown in FIG. 12, in the present embodiment, the code C1 for error detection and correction is generated in a horizontal direction in the figure in an interleaving length of 156 bytes so that the code C1 is completed within the same sector. Further, the code C2 is generated in an interleaving length of 170 bytes (170 frames) (approximately 13 sectors) in a direction that meets obliquely with the code C1. The code C1 is formed of 8 bits and the code C2 of 14 bits.

In an embodiment shown in FIG. 11 and FIG. 12, the code C1 is completed within the sector, but the code C2 is made to be prescribed within a new scope of 170 frames successively. Namely, the code C2 is generated in such a manner as folding in.

Figure 13:
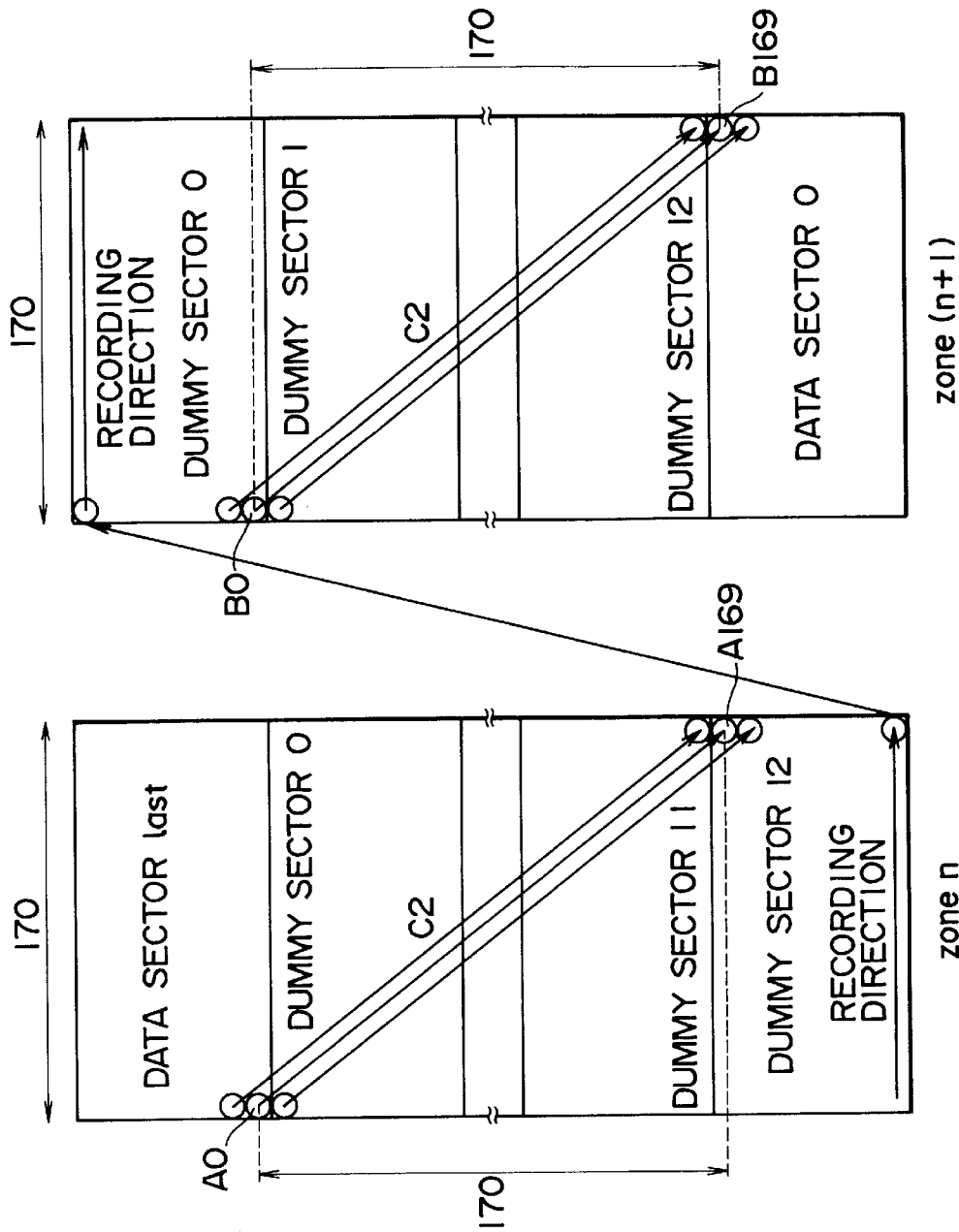
FIG. 13 is a diagram showing another configuration in the vicinity of a boundary portion of a zone.

Accordingly, in such a case, dummy data are recorded (a dummy sector is formed) only within a scope of at least 170 bytes (170 frames) at a terminal portion of a zone n and at a head portion of a next zone n+1 as shown in FIG. 13. The number of these dummy sectors is set to 13 pieces so that effective data and dummy data are not included within the same sector.

In a zone CAV, it happens sometimes that the frequency of a clock changes and locking of the PLL circuit gets out of place when the zone is switched. Therefore, as shown in FIG. 10 or FIG. 13, it is desirable that processing of error detection and correction (interleaving processing) is made not to extend over different zones, thus making it possible to perform quick and accurate data processing.

Figure 14:
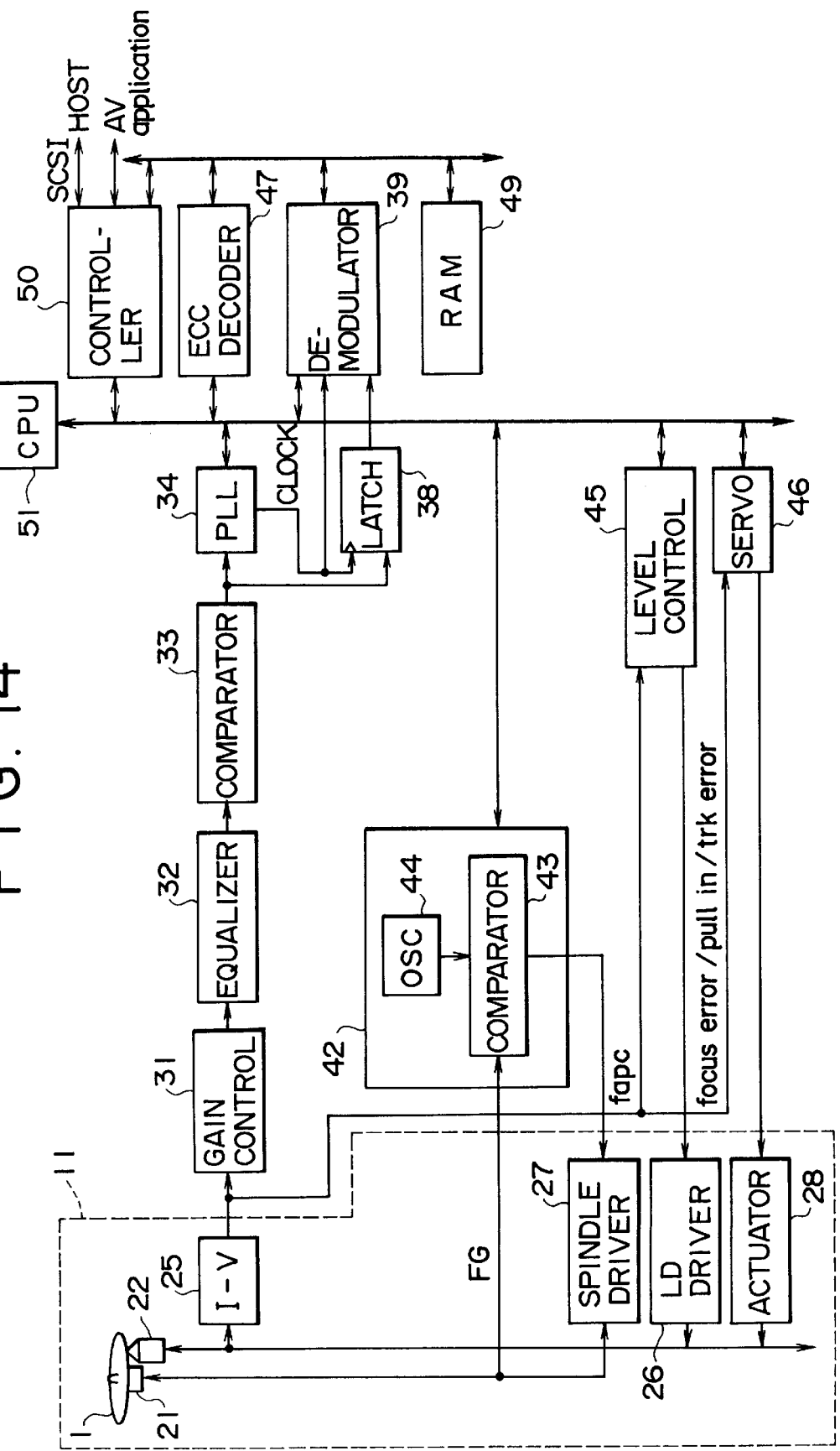
FIG. 14 is a block diagram showing a configuration example of an apparatus for regenerating data of the present invention.

FIG. 14 shows a configuration example of a regenerating apparatus in the case of regenerating a disk (a disk for exclusive use for regeneration) 1 having a format shown in FIG. 11 and FIG. 12. As it is apparent when FIG. 14 and FIG. 7 are compared with each other, in the structure of the embodiment shown in FIG. 14 circuits for recording shown in FIG. 7, viz. the phase control circuit 41, the magnetic head driver 24, the magnetic head 23, the modulator 40 and the ECC encoder 48 are omitted. Further, since a normal optical disk is adopted in place of a magneto-optic disk in the case of a disk for exclusive use for regeneration, the gain control circuit 35, the equalizer 36 and the comparator 37 for regenerating an MO signal are also omitted.

Furthermore, in the case of the embodiment shown in FIG. 11 and FIG. 12, the address is recorded as a part of data. Therefore, the address read circuit 52 is also omitted. Thus, the CPU 51 reads the data in the address area as the address out of the data applied with error detection and correction by the ECC decoder 47.

Since the operation of an embodiment shown in FIG. 14 at time of regeneration is basically similar to the case shown in FIG. 7, the description thereof will be omitted.

Figure 15:
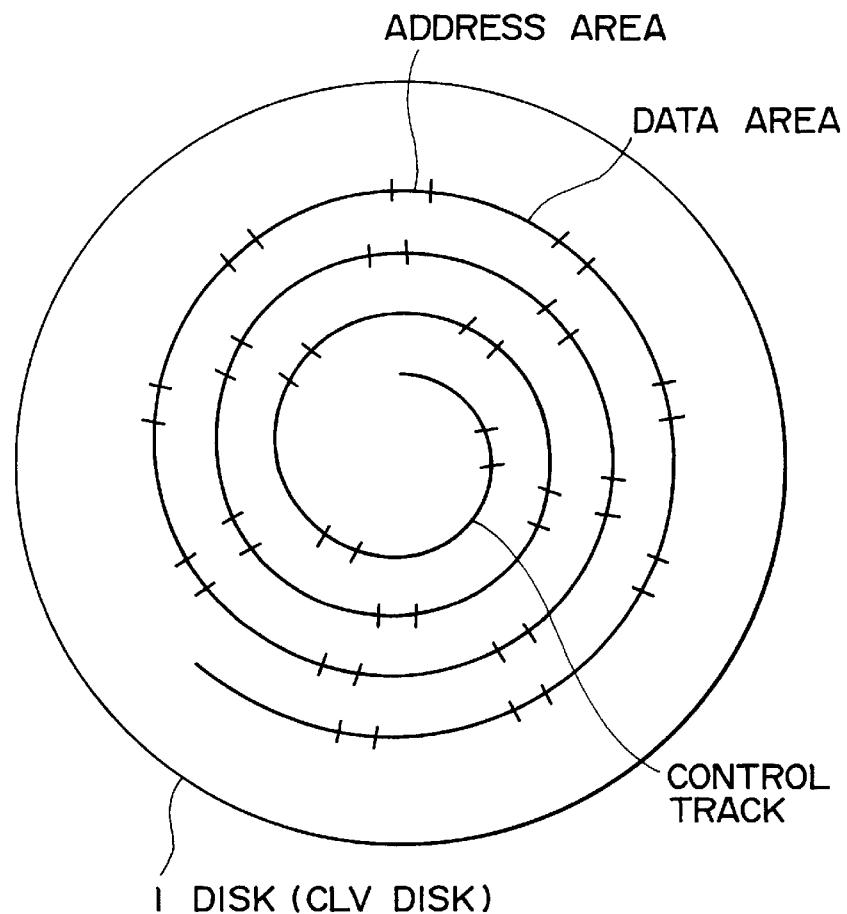
FIG. 15 is a diagram showing a configuration of a data recording disk of the present invention.
Figure 18:
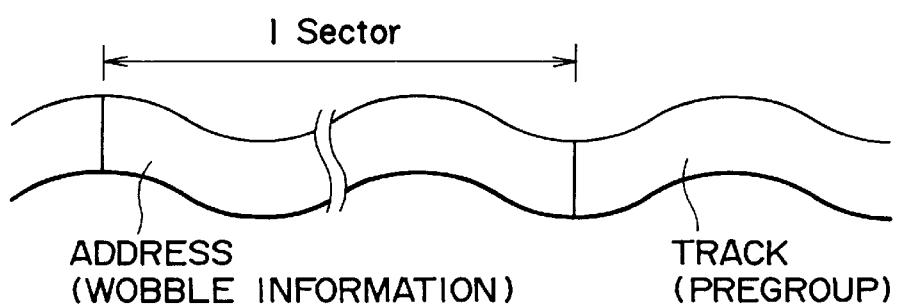
FIG. 18 is a diagram for explaining an address recording state of a data recording disk of the present invention.

When the format shown in FIG. 11 and FIG. 12 is recorded in a zone CAV disk as shown in FIG. 6, it is possible to adopt the same format as the case when recording is made at a constant linear velocity (CLV) as shown in FIG. 15. Further, it is arranged so that those data that are required to process with a computer for example are recorded in a disk of a zone CAV system. Being a disk of a zone CAV system, it is possible to secure random access property and to realize an interactive disk.

In contrast to the above, those data that are required to be recorded or regenerated successively in time series such as audio data or video data are recorded in such a CLV disk as shown in FIG. 15.

Further, in a zone CAV disk, 01H for instance is recorded in a control track provided in the innermost circumference or in the outermost circumference as an identification code showing that the data have been recorded in the zone CAV system, and in a CLV disk, 00H is recorded in the control track thereof as an identification code showing that the data have been recorded in the CLV system.

Figure 16:
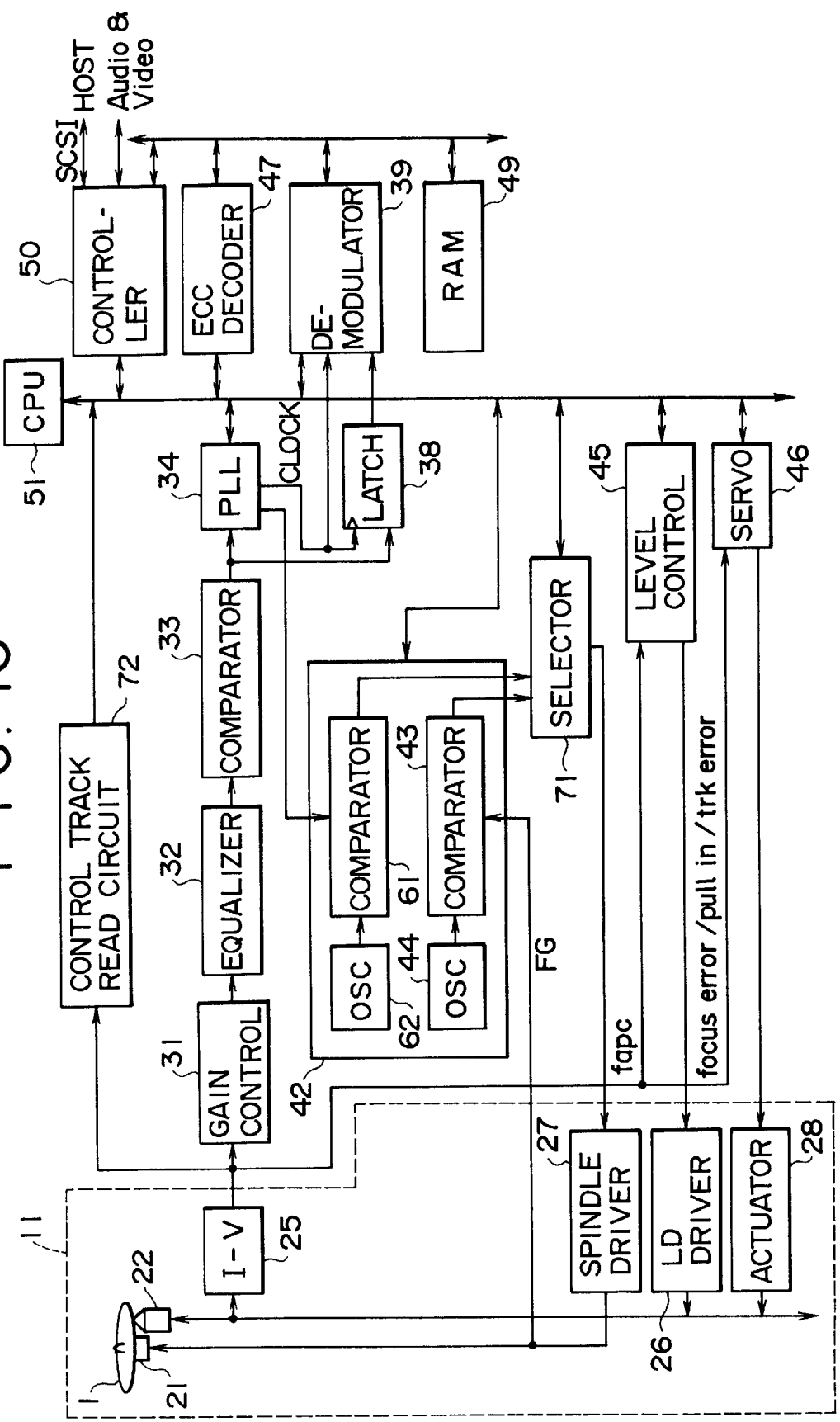
FIG. 16 is a block diagram showing a configuration example of an apparatus for regenerating data of the present invention.

FIG. 16 shows a configuration example of a regenerating apparatus which is made possible to regenerate both disks when a zone CAV disk and a CLV disk are recorded with the same format as described above. In the present embodiment, a control track read circuit 72 for reading information in the control track from the current/voltage conversion circuit 25 is provided. The output of the control track read circuit 72 is supplied to the CPU 51. Further, in a spindle servo circuit 42, there are provided an oscillator 62 and a comparator 61 for comparing the frequency of a clock outputted by a PLL circuit 34 with the frequency of a signal generated by the oscillator 62 in addition to a comparator 43 and an oscillator 44. Further, it is arranged so that the outputs of the comparators 61 and 43 are selected by a selecting circuit 71 and supplied to a spindle driver 27. Other structure is similar to the case shown in FIG. 14.

Namely, in the present embodiment, the CPU 51 has the optical head 22 make access to the control track of the disk 1 and regenerates the data recorded there when a regeneration command is inputted through the controller 50. The control track read circuit 72 reads the data that have been recorded in the control track from a signal outputted then from the current/voltage conversion circuit 25, and outputs the read result to the CPU 51. The CPU 51 determines from the identification code outputted by the control track read circuit 72 whether the disk is one recorded in the zone CAV system (when the identification code is 01H) or it is a disk recorded in the CLV system (when the identification code is 00H).

In the case of a disk in the zone CAV system, the CPU 51 controls the selecting circuit 71, selects the output of the comparator 43 and outputs it to the spindle driver 27. In this case, similarly to the above-described case, the comparator 43 outputs the frequency error between an FG signal generated by the spindle motor 21 and a signal outputted by the oscillator 44, and the spindle motor 21 is driven corresponding to this frequency error. As a result, the disk 1 is rotated at a constant angular velocity.

On the other hand, when it is determined that the disk 1 is a CLV disk, the CPU 51 controls the selecting circuit 71 so as to select the output of the comparator 61. The comparator 61 compares the frequency of a clock outputted by the PLL circuit 34 with the frequency of a signal outputted by the oscillator 62, and outputs the error signal thereof. This error signal is supplied to the spindle driver 27 through the selecting circuit 71, and the spindle driver 27 drives the spindle motor 21 corresponding to this error signal. As a result, the servo mechanism is applied so that the frequency of the clock generated by the PLL circuit 34 coincides with the frequency of the signal generated by the oscillator 62, and the disk 1 is rotated at a constant linear velocity.

Since the operation of regenerating data is similar to the case described above, the description thereof is omitted.

Figure 17:
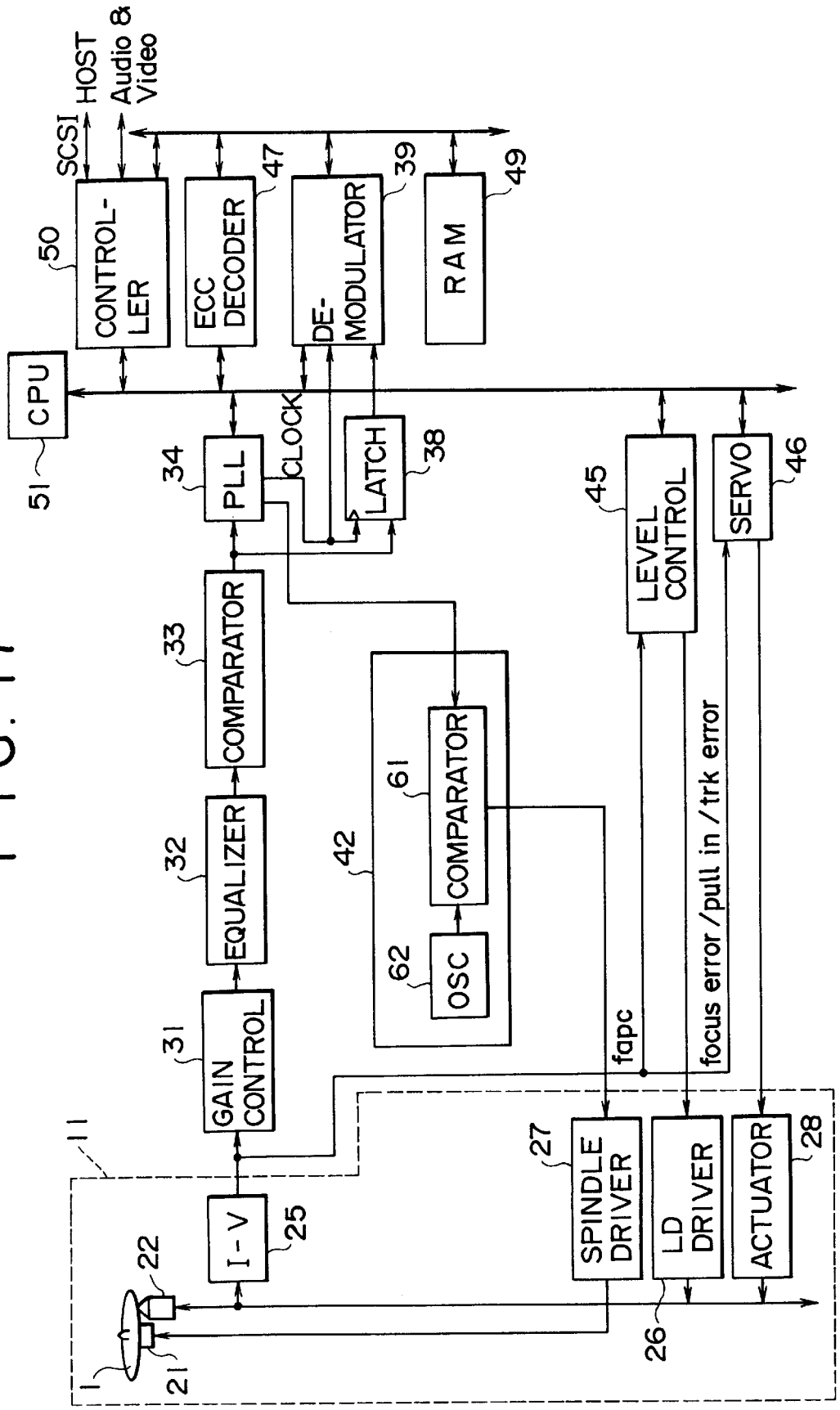
FIG. 17 is a block diagram showing a configuration of another embodiment of an apparatus for regenerating data of the present invention.
Figure 19:
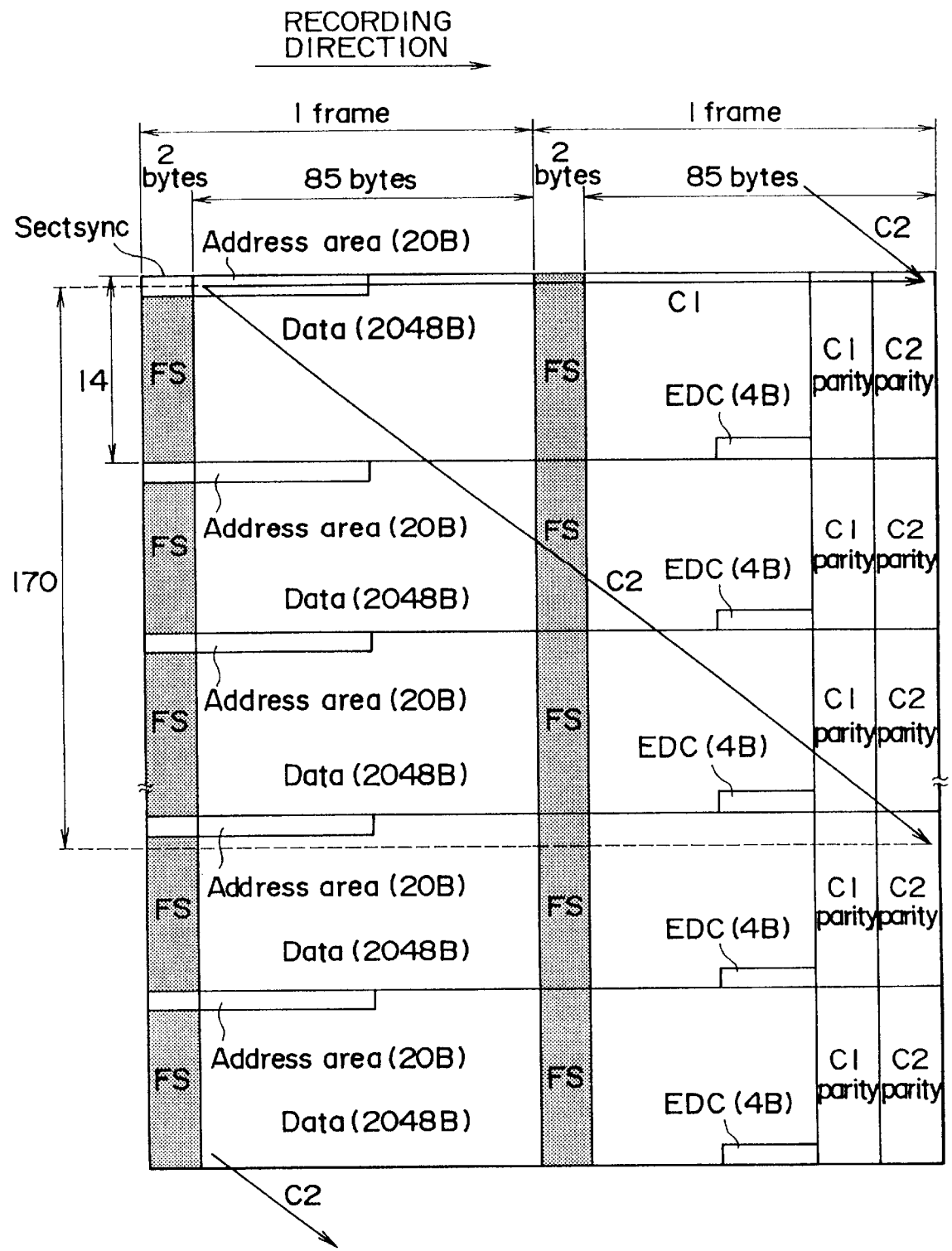
FIG. 19 is a diagram for explaining an error detection and correction code of a conventional data recording disk.

FIG. 17 shows a configuration example of a regenerating apparatus for regenerating a CLV disk. In the present embodiment, a spindle servo circuit 42 is structured so as to include an oscillator 62 and a comparator 61. In this structure, the oscillator 44, the comparator 43, the selecting circuit 71 and the control track read circuit 72 used in the embodiment shown in FIG. 16 are omitted. The other structure is similar to the case shown in FIG. 16.

Namely, in the present embodiment, when the disk 1 is a CLV disk, the comparator 61 outputs the error between the frequency of a signal outputted by the oscillator 62 and the frequency of a clock outputted by the PLL circuit 34 similarly to the case explained with reference to FIG. 16. Therefore, the spindle motor 21 is driven so that the linear velocity of the disk 1 becomes constant.

As against the above, when the disk 1 is a zone CAV disk, the spindle servo circuit 42 performs similar operation to a case that the disk 1 is a CLV disk. Namely, the servo mechanism is applied so that the frequency of the clock generated by the PLL circuit 34 coincides with the frequency of the signal generated by the oscillator 62. In the zone CAV disk, when the servo mechanism is applied so that the clock regenerated therefrom shows a constant frequency, the zone CAV disk is also rotated at a constant angular velocity eventually. Accordingly, it becomes also possible to regenerate a disk recorded in a zone CAV system in a regenerating apparatus for exclusive use for the CLV disk.

Besides, the address area has been formed in an area different from the data area as a prepit in the embodiment shown in FIG. 6, but a pregroup (track) may also be formed by what is called wobbling by adopting address information as wobbling information. In this case, processing of the error detection code is also performed on the address information (wobbling information) with a sector as the unit.

A case in which the present invention is applied to an optical disk (a magneto-optic disk) has been described as an example, but it is also possible to apply the present invention to a data recording disk of other types.

What is claimed is:

1. A data recording disk wherein:

a track for recording data is divided into a plurality of sectors;

each sector is composed of a first area for recording addresses and a second area for recording data;

a first code for error detection of said address is completed in said first area; and a second code for error correction of said data is completed extending over said plurality of sectors of said track.

2. A data recording disk according to claim 1, wherein said data recording disk is divided into a plurality of zones, the number of said sectors per track in each zone is changed from zone to zone, and said second code is completed within said zone.

3. A data recording disk according to claim 2, wherein dummy data are recorded in a sector at a head portion or at a terminal portion of said zone in order to complete said second code within said zone.

4. A data recording method for recording data in a data recording disk, comprising the steps of:

dividing a track for recording data into a plurality of sectors;

composing each sector of a first area for recording addresses and a second area for recording data;

completing a first code for detecting an error of said address within said first area; and completing a second code for correcting an error of said data extending over said plurality of sectors of said track.

5. A data recording apparatus for recording data in a data recording disk in which a track for recording data is divided into a plurality of sectors, and each sector is composed of a first area for recording addresses and a second area for recording data, comprising:

address processing means for performing processing for a code for error detection of said address within said one first area; and data processing means for performing processing for a code for error detection of said data extending over said plurality of sectors of said track.

6. A data recording apparatus according to claim 5, wherein said data processing means divides said data recording disk into a plurality of zones, changes the number of said sectors per track in each zone from zone to zone, and completes the processing for the code for error correction of said data within said zone.

7. A data recording apparatus according to claim 6, wherein said data processing means arranges dummy data in a sector at a head portion or at a terminal portion of said zone in order to complete processing on a code for error correction of said data within said zone.

* * * * *